United States Patent
Liu et al.

(10) Patent No.: US 9,352,716 B2
(45) Date of Patent: May 31, 2016

(54) AIR BAG DOOR HINGE FOR A MOTOR VEHICLE

(71) Applicant: Ford Global Technologies, LLC, Dearborn, MI (US)

(72) Inventors: Frank Qiukui Liu, Canton, MI (US); Thomas Junior Luckett, Saline, MI (US); Kenneth J. Kwasnik, Shelby Township, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/341,044

(22) Filed: Jul. 25, 2014

(65) Prior Publication Data

US 2015/0258957 A1   Sep. 17, 2015

Related U.S. Application Data

(60) Provisional application No. 61/952,948, filed on Mar. 14, 2014.

(51) Int. Cl.
*B60R 21/215* (2011.01)
*B60R 21/205* (2011.01)

(52) U.S. Cl.
CPC ............ *B60R 21/215* (2013.01); *B60R 21/205* (2013.01); *B60R 2021/21537* (2013.01)

(58) Field of Classification Search
CPC .. B60R 21/215; B60R 21/205; B60R 21/206; B60R 21/2155; B60R 2021/21537; B60R 2021/21512; B29L 2031/3038

USPC ............................ 280/728.3, 728.2, 732, 731
See application file for complete search history.

(56) References Cited

U.S. PATENT DOCUMENTS

| | | | |
|---|---|---|---|
| 7,007,970 B2 | 3/2006 | Yasuda et al. | |
| 7,178,825 B2 | 2/2007 | Fujii et al. | |
| 7,210,700 B2 | 5/2007 | Zagrodnick et al. | |
| 7,234,726 B2 | 6/2007 | Trevino et al. | |
| 7,740,269 B2 | 6/2010 | Kang | |
| 7,887,087 B2 | 2/2011 | Mazzocchi et al. | |
| 2009/0134608 A1* | 5/2009 | Kang | 280/728.3 |
| 2011/0316262 A1* | 12/2011 | Mazzocchi et al. | 280/728.3 |

FOREIGN PATENT DOCUMENTS

| | | | | |
|---|---|---|---|---|
| JP | 2007076393 A | * | 3/2007 | |
| JP | 2007118895 A | * | 5/2007 | |
| JP | 4173381 B2 | | 10/2008 | |
| JP | 2009143474 A | * | 7/2009 | |
| WO | 2013030473 A1 | | 3/2013 | |

* cited by examiner

*Primary Examiner* — Keith Frisby
(74) *Attorney, Agent, or Firm* — Vichit Chea; Price Heneveld LLP (57) ABSTRACT

An automobile air bag mounting structure includes a chute defining an opening with a first wall extending from the opening, a cover fully sealing the opening, and a hinge member extending integrally between the first wall and a portion of the cover. The hinge member extends from the first housing wall and to the cover in a direction toward the opening with at least one segment therebetween extending away from the opening.

20 Claims, 5 Drawing Sheets

AIR BAG DOOR HINGE FOR A MOTOR VEHICLE

CROSS-REFERENCE TO RELATED APPLICATION

This application claims the benefit of U.S. Provisional Patent Application No. 61/952,948, filed on Mar. 14, 2014, entitled "AIR BAG DOOR HINGE FOR A MOTOR VEHICLE," which is hereby incorporated by reference in its entirety.

FIELD OF THE INVENTION

The present invention generally relates to an air bag housing structure including a hinge integrally formed with a chute wall and a cover that supports a portion of the instrument panel substrate over an opening of the chute. The hinge provides multiple areas of deformation for improved resiliency.

BACKGROUND OF THE INVENTION

Automotive air bag systems include an air bag module mounted within a housing that is concealed beneath a surface of the vehicle interior. In particular, passenger air bag systems may include a chute defined by the housing and extending within the dashboard of the associated vehicle. The chute may be concealed beneath a surface of the dashboard, or instrument panel substrate. In such an arrangement, the outermost layer of the dashboard extends over an opening to the air bag chute and is supported by a door panel that is movably coupled with a portion of the housing, which may include a wall of the chute. The adjacent portion of the dashboard or instrument panel substrate includes a pre-weakened tear line that ruptures upon air bag deployment, allowing the air bag to deploy within the chute, out of the opening thereof, and from out of the dashboard. The door panel provides support for the topper and dashboard substrate and is typically hingedly coupled with the chute so as to rotate during air bag deployment such that the portion of the dashboard substrate over the door opens away from the deploying air bag in a generally predetermined movement.

Previous housings have included a hinge that is integrally formed with both the chute or other adjacent structure and the door panel. Housings having such hinges are often made from a plastic material exhibiting some degree of flexibility such that the hinge may provide the desired opening motion by bending or flexing. Some hinges of this type have been developed to provide the general ability to bend or flex through a desired opening motion of the associated door. However, due to the high levels of pressure with which a typical air bag deploys (which is, in turn, applied to the door and the hinge during deployment), the hinge coupling the door panel to the chute may experience a significant amount of force, which can result in rupture or other undesirable plastic deformation of the hinge or adjacent portions of the housing. Accordingly, improvements to such hinge structures that can provide for reduction in localized stress, particularly at the point of attachment with the chute, are desired.

SUMMARY OF THE INVENTION

According to one aspect of the present invention, an automobile air bag mounting structure includes a chute defining an opening with a first wall extending from the opening, a cover fully sealing the opening, and a hinge member extending integrally between the first wall and a portion of the cover. The hinge member extends from the first housing wall and to the cover in a direction toward the opening with at least one segment therebetween extending away from the opening.

According to another aspect of the present invention, an air bag housing includes an opening, a first wall extending from the opening, and a cover continuously extending over the entire opening. The housing also includes a hinge having first, second and third segments. The first and third segments respectively extend integrally from the first wall and to the cover in directions generally toward the opening, and the second segment extends generally away from the opening between and integral with the first segment and the third segment.

According to another aspect of the present invention, an air bag assembly includes a housing having a chute defining an opening with a first wall extending from the opening, a cover fully sealing the opening, and a hinge member extending integrally between the first wall and a portion of the cover. The hinge member extends from the first housing wall and to the cover in a direction toward the opening with at least one segment therebetween extending away from the opening. The assembly also includes an air bag module coupled to the housing within the chute.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
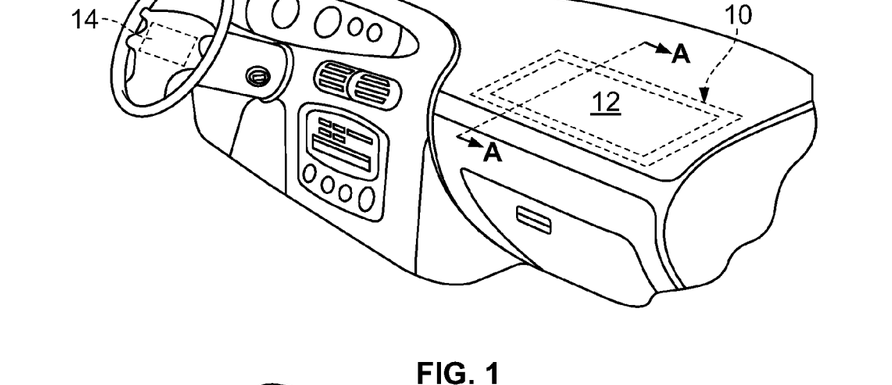
FIG. 1 is a perspective view of an interior compartment of an automobile having an air bag module.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring now to FIG. 1, an interior of an automobile is illustrated having an air bag module 10 located proximate an instrument panel substrate 12. In the illustrated embodiment, the air bag module 10 is configured in a "top mount" position in which the air bag module is adjacent an upper surface of a dashboard or instrument panel 12. According to another embodiment, the air bag module 10 could be configured in a "front mount" position in which the air bag module 10 is positioned proximate a glove box. Additionally or alternatively, the automobile may have an air bag module, which may be suitable for use in a steering wheel air bag module 14. The air bag module may be located elsewhere in the vehicle in various embodiments.

Figure 2:
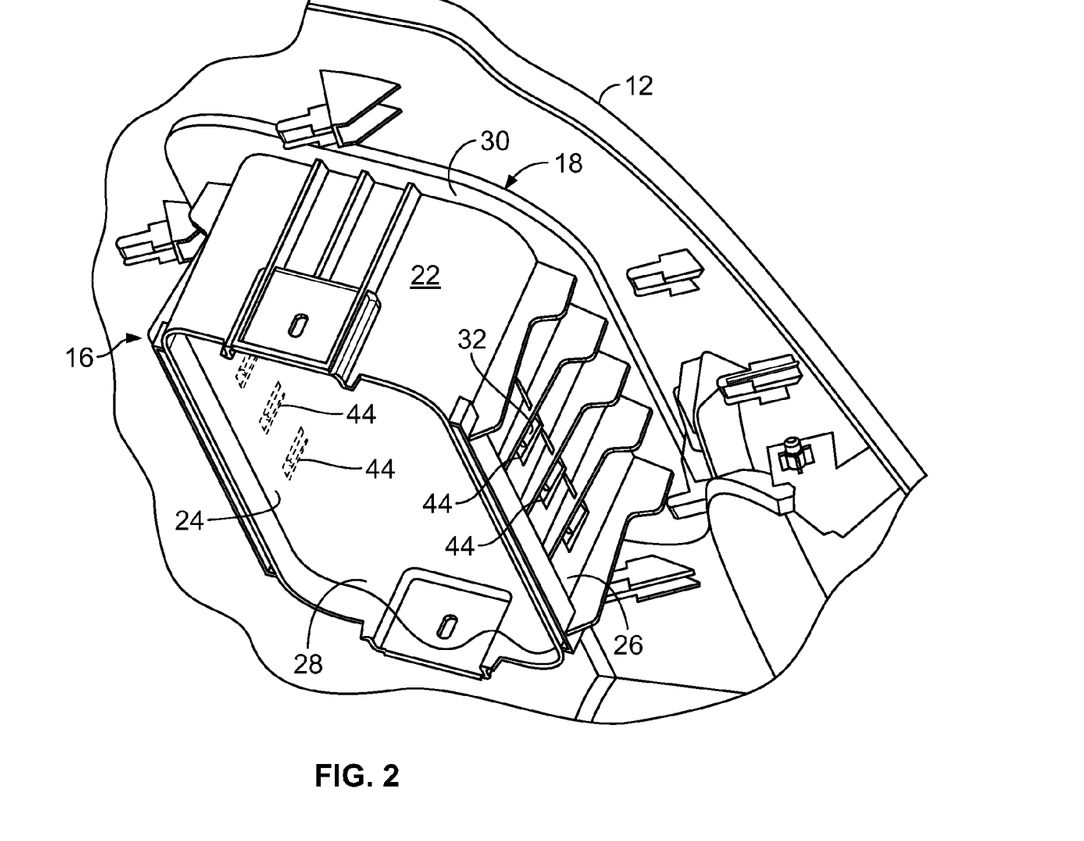
FIG. 2 is a perspective view of the air bag module.
Figure 3:
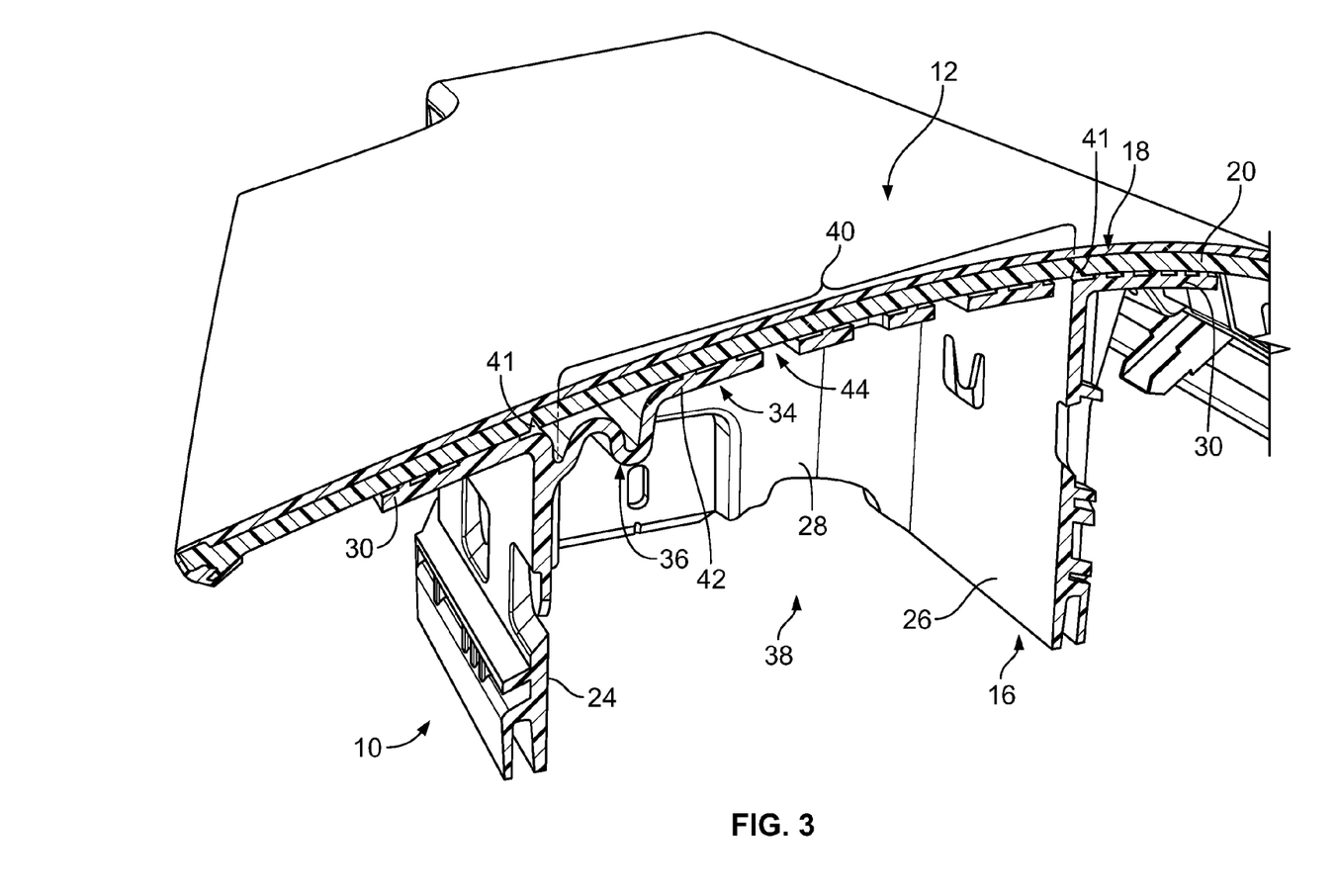
FIG. 3 is a cross-sectional perspective view taken along line A-A of FIG. 1, illustrating the air bag module.

Referring to FIGS. 2 and 3, the air bag module 10 comprises a housing chute 16 for at least partially enclosing or surrounding an air bag (not illustrated), as well as a topper 18 that covers the housing chute 16. The module 10, as discussed above, can be positioned within the instrument panel or steering wheel of a vehicle, for example, for mounting of an airbag unit (not shown) therein in an assembly of the two components. The housing chute 16 includes a top wall in the form of a moveable panel 34 or door that is positioned directly beneath the topper 18. Specifically, the topper 18 comprises a base section 20 that is positioned atop the top wall 34 of the housing chute 16. The shape of the topper base 20 and the top wall 34 of the housing chute 16 substantially corresponds to the shape of the instrument panel substrate 12. Although the instrument panel substrate 12 may take on a slightly curved configuration, for purposes of this discussion, it will be referred to as a generally planar configuration. As such, the top wall 34 of the housing chute 16 and the topper base 20 are considered to be generally coplanar with one another, as well as with the instrument panel substrate 12 (FIGS. 1 and 2).

The air bag chute 16 also includes a plurality of walls described as a front wall 24, a rear wall 26, and two sidewalls 22, 28 which extend downwardly from the top wall 34. The plurality of walls 22, 24, 26, and 28 together define an interior 38 of the chute 16 and surround an opening 40 of chute 16 at an upper end thereof (i.e. adjacent to topper 18). The front and rear walls 24, 26 may each contain several window apertures 44 for engagement with a corresponding number of attachment hooks extending from an air bag container (not illustrated). The window apertures 44 have pressure tabs 32 that bear against the inserted hooks to tighten the engagement connections and prevent rattling from occurring between the air bag container and the air bag chute 16 during vehicle operation, prior to air bag deployment.

As illustrated, panel 34 extends over at least a portion of the opening 40 so as to provide support for topper 18. Panel 34 can be inset relative to chute 16 with topper base 20 continuously extending over opening 40 in its entirety and being coupled with both panel 34 and with the outer flange 30 that surrounds opening 40 and extends integrally from the upper end of walls 22, 24, 26, and 28. In this arrangement, while panel 34 may be somewhat smaller than opening 40 to provide for clearance or the like during air bag deployment (as discussed below), opening 40 is fully sealed by topper 18 when module 10 is in the initial position (i.e. prior to air bag deployment). Panel 34 may also include several apertures 44. Such apertures 44 are positioned to reduce the mass of the top wall 34 without affecting its support or attachment properties. Topper 18, including topper base 20 extends continuously over any apertures 44 in panel 34 so as to seal opening 40 despite the presence of apertures 44 in panel 34.

Figure 4:
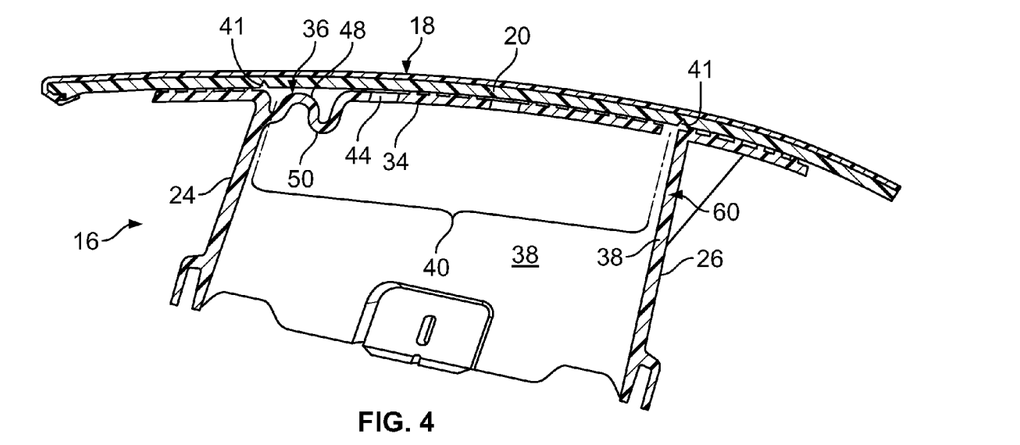
FIG. 4 is an elevated, side, cross-sectional view taken along line A-A of FIG. 1, illustrating the air bag module.
Figure 5:
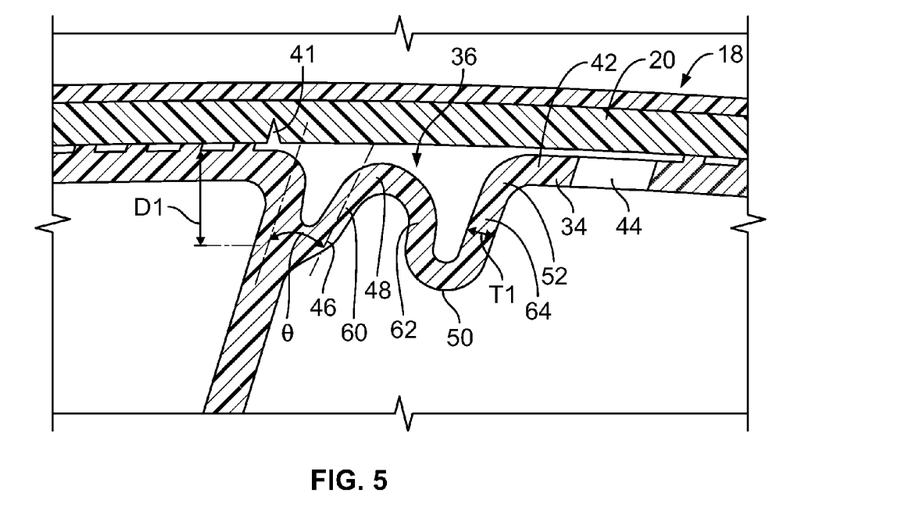
FIG. 5 is an elevated, side, cross-sectional view of a hinge structure of the air bag module.

Hinge 36 extends between one of the walls 22, 24, 26, or 28 of chute 16 and an edge of panel 34 adjacent to that wall to provide a flexible attachment for panel 34 to chute 16. As shown in FIGS. 3-5, the illustrated embodiment of hinge 36 extends from a portion of front wall 24 positioned at a distance D1 (FIG. 5) beneath opening 38 and joins with panel 34 by extending continuously thereinto along a side 42 of panel 34 adjacent front wall 24. Hinge 36 may be integrally formed in a single piece of material with housing chute 16 and may further be integrally formed with panel 34 such that chute 16, panel 34, and hinge 36 are of a single piece of material, which can be of a somewhat flexible material, such as a polymeric material, for example Dexflex™ or other material that exhibits a level of ductility at cold temperatures (at least to −30° C.) and acceptable toughness at high temperatures (at least to 90° C.). Other materials such as TPO (Thermoplastic Olefin), TPE (Thermoplastic Elastomer) or TEO (Thermoplastic Elastomer Olefin) may also be used.

In the embodiment of hinge 36 described above, hinge 36 is of the type generally referred to as a "living hinge", wherein a comparatively flexible region of a unitary structure is positioned between two comparatively more rigid portions of the unitary structure, the relative degrees of rigidity and flexibility being provided by the geometry of the respective regions such that the more rigid portions are rotatable relative to each other about the more flexible region. The geometry of a unitary structure may provide a comparatively more flexible region by a reduction in material thickness, incorporation of various flexation features or regions, and/or a gap in reinforcement that may be integral or coupled with the more rigid portions. In the example shown, hinge 36 defines an S-shape between front wall 26 and panel 34 with a plurality of bent portions 46, 48, 50, and 52 defined therein (along the direction of cross section A-A in FIGS. 3-5) that can provide areas of flexation for hinge 36 that contribute to hinge 36 being more flexible than front wall 24 and panel 34.

As shown, bent portion 46 is positioned at the junction between front wall 24 and hinge 36. Similarly, bent portion 52 is positioned at the junction between hinge 36 and panel 34. In a variation of the example shown, hinge 36 can join with panel 34 on a face thereof opposite topper 18 such that side 42 of panel 34 defines a discrete edge adjacent front wall 24. The remaining bent portions 48 and 50 are defined by the S-shape of hinge 36 and are positioned between bent portions 46 and 52. Hinge 36 can also define generally planar sections or arms 60, 62, and 64 between successive ones of bent portions 46, 48, 50, and 52. As shown in FIG. 5, hinge 34 can be configured with portions or segments thereof extending in a direction toward opening 40 and at least one additional portion or segment extending away from opening 40 and being positioned between adjacent segments that extend toward opening 40. In the example shown, arm 60 extends away from front wall 24 in a direction toward opening 44, and arm 64 extends to door panel 34 in a direction toward opening 40. Further, arm 62 extends between arm 60 and arm 64 in a direction away from opening 40.

Arms, such as arm 64, may be relatively short in comparison with bent portions 48 and 50, for example, so as to appear as a tangent area or transition between bent portions 48 and 50. In other examples, arms 62 and 64 can extend along a distance of between about 3 mm and about 6 mm, for example. As such, arms 62, 64, and 66 can be configured to appropriately position hinge 36 relative to front wall 24 and to position panel 34 in the desired location within opening 40 of chute 16. Further, arms 62, 64, and 66 can be configured to provide a desired shape and positioning for bent portions 48 and 50.

In particular, bent portion 46 and arm 48 are positioned and configured such that arm 62 extends from front wall 24 in an upward direction with respect thereto (i.e. toward opening 40). As shown, arm 62 is positioned by attachment with front wall 24 by bent portion 46 to be at an angle Θ of no more than ninety degrees (90°). In an embodiment, angle Θ is between 10 degrees and 80 degrees, with further embodiments of hinge 36 being configured such that angle Θ is between about 10 degrees and 35 degrees or between about five degrees (5°) and about 40 degrees. In these various embodiments, distance D1 can be sufficient for arm 62 to be positioned at the desired angle Θ, while providing appropriate room beneath topper 18 for the further bent portions 48, 50, and 52 and associated arms 64, and 66. In one embodiment distance D1 can be between about 6 mm and about 10 mm, although other distances may be used, as dictated by possible variations in the remaining shape of hinge 36.

The particular shape of bent portions 46, 48, 50, and 52 can vary depending on a number of factors, including for example, the material used for hinge 36, chute 16 and panel 34, as well as the desired flexibility of hinge 36, among others. In the example shown in the Figures, bent portions 46, 48, 50, and 52 can be configured to provide for flexibility of hinge 36 to facilitate movement, including rotation, of panel 34 upward and out of opening 40 (as described further below). In such a configuration, bent portion 48 can be generally round in shape so as to have an internal radius of about 3 mm, and bent portion 50 can also be generally round in shape with an internal radius of about 1.5 mm. The particular relative dimensions of the internal radii of bent portions 48 and 50 can vary in a number of ways, but in one embodiment hinge 36 can be such that the internal radius of bent portion 48 is larger than the internal radius of bent portion 50. In one example, the internal radius of bent portion 48 is larger than the internal radius of bent portion 50 by a ratio of about 2:1.

Further, bent portion 46 can be configured to have an internal radius of about 1 mm and can further be configured such that the internal radius thereof extends generally continuously from front wall 24 in the general configuration of a fillet between hinge 36 and wall 24 such that hinge 36 extends from wall 24 in through an initially curved portion in a direction away from wall 24. Such a configuration can provide for additional reinforcement of the integral coupling between hinge 36 and wall 24 without introducing a stress concentration at the coupling location therebetween. Such an internal radius and fillet combination can be configured to space arm 62 apart from the upper portion of wall 24 by a distance desired to accommodate some inward rotation of arm 62 (i.e. reduction in Θ) during air bag deployment, but with arm 62 otherwise positioned as close to wall 24 as possible.

Bent portion 52 can have an internal radius of about 3 mm, and in one embodiment the internal radius of bent portion 52 can be equal to the internal radius of bent portion 48. Other variations are possible and include shapes wherein one or more of the bent portions 46, 48, 50, and 52 have a variable or multiple radius. As mentioned above, other factors may influence the degree of flexibility provided by hinge 36. In an embodiment, hinge 36 can have a thickness T1 that is equal to or less than those of front wall 24 and/or panel 34. In a particular embodiment, the thickness T1 of hinge 36 can be about 3 mm.

The topper cover 18 includes a tear seam 41 that is positioned adjacent to and around opening 40 of housing chute 16. The tear seam 41 is pre-weakened to the extent that the instrument panel substrate 12 and a portion of the topper 18 will rupture upon deployment of the air bag. As shown in FIGS. 3-5, tear seam 41 can extend partially through topper base 20. Tear seam 41 can, in an example, extend around all four sides of opening 40, which can include the sides adjacent front wall 24, rear wall 26, and side walls 22 and 28.

Figure 6:
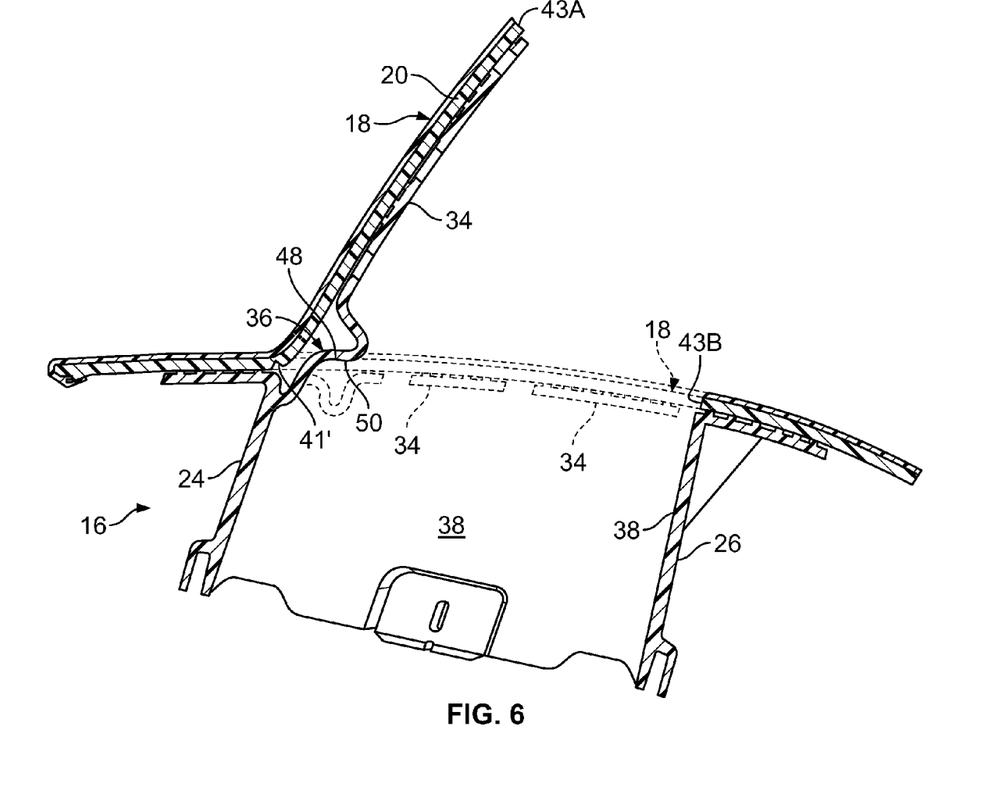
FIG. 6 is an elevated, side, cross-sectional view of the air bag module during a deployment of an air bag therefrom.
Figure 7:
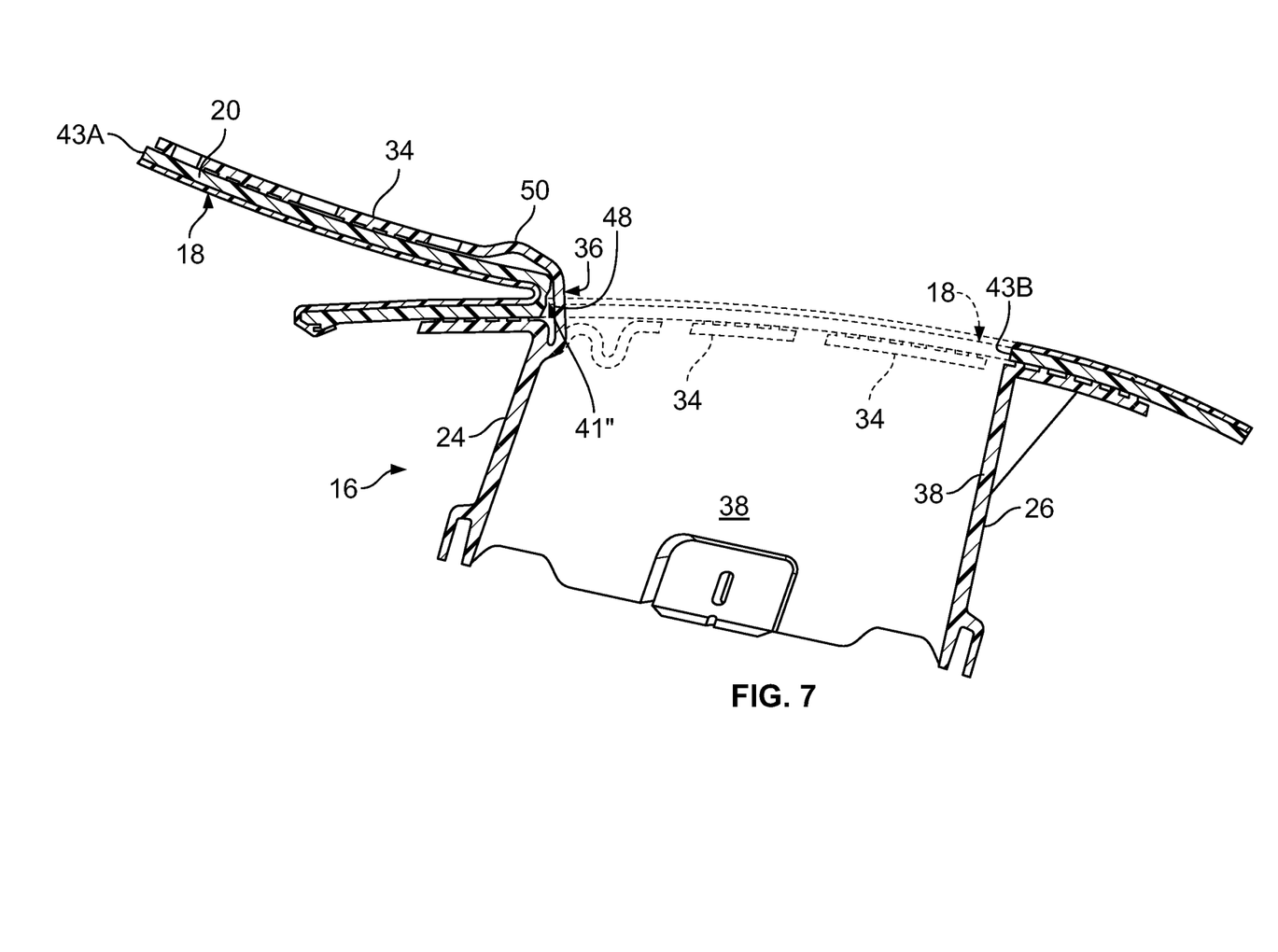
FIG. 7 is an elevated, side, cross-sectional view of the air bag module with the air bag in a deployed position.

Referring to FIGS. 6 and 7, movement of panel 34, as facilitated by hinge 36 during deployment of an air bag is illustrated (the actual air bag is not shown for purposes of clarity). In the broken line portion of the drawing, panel 34 is shown in its closed position, as it would normally be when installed in a vehicle and prior to air bag deployment (and as illustrated in FIGS. 3-5). Upon deployment of the air bag, the forces applied against the underside of panel 34 by the deploying air bag cause tear seam 41 to rupture at least around a portion thereof. The at least partial rupture of tear seam 41 under continued pressure from the deploying air bag allows panel 34 to move at least by rotation, along with the instrument panel substrate 12 and the base 20 of the topper 18, to allow the air bag to release toward a passenger. In another embodiment, panel 34 itself can be connected around the remaining portions between panel 34 and the portions of walls 22, 24, 26, and 28 by a rupturable seal or weakened portion formed integrally therebetween. In such an embodiment, panel 34 can further be free from any apertures or other openings therein.

As discussed above, hinge 36 extends substantially between the front wall 24 and panel 34 and deforms to remain extending between front wall 24 and panel 34 upon deployment of the air bag (as shown in the solid-lined hatched portion of FIGS. 6 and 7). The particular structure of hinge 36, described above, as well as tear seam 41 are such that the movement of panel 34 from out of opening 40 includes rotation about an axis positioned within or adjacent to hinge 36 and may include translation in one or more directions (such as upward out of opening 40 and/or toward the front of the instrument panel substrate 12). In the example shown in FIGS. 6 and 7, tear seam 41 may accommodate such movement of panel 34 by partially rupturing at least along the portions thereof adjacent rear wall 26 and side walls 22 and 28, resulting in edges 43A and 43B respectively on a rotating portion of topper 18 associated with panel 34 and a stationary portion of topper 18 on instrument panel 12. A non-ruptured portion of tear seam 41' (FIG. 6) can open, possibly resulting a partial rupture, to allow rotation of panel 34 and the associated portion of topper 18.

As shown in FIG. 6, during initial movement of panel 34 away from opening 40, hinge 36 flexes particularly in the areas of bent portions 46 and 48 with bent portion 48 tending to expand and bent portion 46 tending to compress. Additional deformation may also occur within hinge 36 during air bag deployment, and may include flexing of arms 62, 64, and 66, and respective contraction and expansion of bent portions 46 and 52. In further movement of panel 34 away from opening 40, as shown in FIG. 7, further deformation of hinge 36 can result in an extension thereof such that hinge 36 wraps around the adjacent portions of panel 34 by expansion of bend portions 48, 50, and 52, along with deformation of one or both of arms 62 and 64. In such an instance, a portion of hinge 36 may contact a portion of topper 18 in the area of tear seam 41", which may further expand to accommodate the continued movement of panel 34.

By providing multiple areas over which hinge 36 may deform during deployment of an associated air bag in the form of bent portions 46, 48, 50, and 52, as well as an overall length of hinge 36 that further includes arms 62, 64, and 66, the deformation, stress, and/or strain of such individual portions thereof may be reduced compared to hinge structures with a shorter material length and/or fewer deformable areas. Further, the distribution of deformation may be configured unevenly such that the deformation of bent portion 46 at the point of attachment of hinge 36 with front wall 24 may be lower than other portions of hinge 36. The positioning of arm 62 in the upward orientation (i.e. at angle Θ of no more than 90°) may further reduce the deformation of bent portion 46 during air bag deployment. Such a reduction in deformation may lead to reduced strain, including plastic deformation or failure of hinge 36 at bent portion 46, which may provide a robust hinge 36 that is more resistant to cracking or detachment from front wall 24 compared to prior hinge structures and may offer improved cold weather performance.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An automobile air bag mounting structure, comprising:
   a chute defining an opening with a planar first wall extending therefrom;
   a cover fully sealing the opening; and
   a hinge member extending integrally between the first wall and a portion of the cover, the hinge member extending initially inward from a location along the first wall spaced apart from the opening, the hinge member joining with the cover and defining a first arm and a second arm extending in a direction toward the opening with a third arm therebetween extending away from the opening, the first arm being joined with the third arm by a first bent portion having a first internal radius and the third arm being joined with the second arm by a second bent portion having a second internal radius that is less than the first internal radius.

2. The mounting structure of claim 1, wherein the cover includes a door positioned within the opening and a topper coupled with the door and extending outwardly over the opening, the portion of the cover with which the hinge joins being disposed along the door, and the hinge being unattached with the topper.

3. The mounting structure of claim 2, further including a flange integral with and extending outward from the chute, the topper being coupled with the flange such that the cover fully seals the opening.

4. The mounting structure of claim 1, wherein the hinge member defines an S-shape extending between the first housing wall and the portion of the cover.

5. The mounting structure of claim 1, wherein the first arm is positioned with respect to the first wall at an angle of between 1 degree and 90 degrees.

6. The mounting structure of claim 1, wherein:
   the first arm extends from the first wall inwardly and along a path that initially curves upward.

7. The mounting structure of claim 1, wherein the second internal radius is less than the first internal radius by a ratio of about 1:2.

8. The mounting structure of claim 1, wherein the second internal radius is about 1.5 mm and the first internal radius is about 3 mm.

9. An airbag housing, comprising:
   an opening;
   a first planar wall extending from the opening;
   a cover continuously extending over the entire opening; and
   a hinge including first, second and third segments, the first and third segments respectively extending integrally inward from a location along the first wall spaced apart from the opening and to the cover in directions generally toward the opening, and the second segment extending generally away from the opening between the first segment and the third segment, the second segment being joined with the first segment by a first bent portion having a first internal radius and with the third segment by a second bent portion having a second internal radius that is less than the first internal radius.

10. The airbag housing of claim 9, wherein the first bent portion extends integrally between the first and second segments, and the second bent portion integrally between the second and third segments.

11. The airbag housing of claim 10, wherein respective ones of the first, second and third segments transition smoothly into adjacent ones of the first and second bent portions.

12. The airbag housing of claim 9, wherein the first segment extends integrally inward from the first wall through a portion of the hinge that is curved upward.

13. The airbag housing of claim 9, wherein the hinge, including the first, second, and third segments and the first and second bent portions thereof, defines a generally S-shaped profile.

14. The air bag housing of claim 9, wherein the cover includes a door positioned within the opening and a topper coupled with the door and extending outwardly over the opening, the portion of the cover with which the hinge joins being disposed along the door, and the hinge being unattached with the topper.

15. The air bag housing of claim 9, wherein the third segment of the hinge extends integrally to the door of the cover.

16. An air bag assembly, comprising:
 a housing, including:
  a chute defining an opening with a first planar wall extending from the opening;
  a cover fully sealing the opening; and
  a hinge member extending integrally between the first wall and a portion of the cover, the hinge member including first, second and third segments, the first segment extending initially inward from a location along the first wall spaced apart from the opening and generally toward the opening, the third segment extending integrally to the cover generally toward the opening, and the second segment extending generally away from the opening between the first segment and the third segment, the second segment being joined with the first segment by a first bent portion having a first internal radius and with the third segment by a second bent portion having a second internal radius that is less than the first internal radius.

17. The assembly of claim 16, wherein the cover includes a tear seam at least partially rupturable by pressure applied to the cover from within the chute.

18. The assembly of claim 17, wherein the hinge member is flexible such that the cover is moveable away from at least a portion of the opening by flexing of the hinge member including movement of the first segment in a direction toward the first wall and movement of the second segment away from the first segment.

19. The assembly of claim 16, wherein the hinge member, including the first, second, and third segments thereof and the first and second bent portions, defines a generally S-shaped profile.

20. The air bag assembly of claim 16, wherein the cover includes a door positioned within the opening and a topper coupled with the door and extending outwardly over the opening, the portion of the cover with which the hinge joins being disposed along the door, and the hinge being unattached with the topper.

* * * * *